(12) United States Patent
Juh et al.

(10) Patent No.: US 8,579,538 B2
(45) Date of Patent: Nov. 12, 2013

(54) TURBINE ENGINE COUPLING STACK

(75) Inventors: Christopher M. Juh, South Windsor, CT (US); Pedro Laureano, Jacksonville, FL (US)

(73) Assignee: United Technologies Corporation, Hartford, CT (US)

( * ) Notice: Subject to any disclaimer, the term of this patent is extended or adjusted under 35 U.S.C. 154(b) by 227 days.

(21) Appl. No.: 12/847,275

(22) Filed: Jul. 30, 2010

(65) Prior Publication Data

US 2012/0027508 A1 Feb. 2, 2012

(51) Int. Cl.
*B25G 3/28* (2006.01)

(52) U.S. Cl.
USPC ...................................... 403/359.5

(58) Field of Classification Search
USPC ........... 403/335, 336, 342, 356, 359.5, 359.1; 415/216.1
See application file for complete search history.

(56) References Cited

U.S. PATENT DOCUMENTS

| | | | |
|---|---|---|---|
| 1,514,314 A | 11/1924 | Douglas | |
| 1,738,893 A | 12/1929 | Grady | |
| 1,785,211 A | 12/1930 | Scofield | |
| 2,089,168 A * | 8/1937 | Brown | 403/259 |
| 2,282,360 A | 5/1942 | Horrocks | |
| 2,437,180 A | 3/1948 | Allen | |
| 2,519,571 A | 8/1950 | Henry | |
| 2,744,395 A | 5/1956 | Massey et al. | |
| 2,785,550 A | 3/1957 | Petrie | |
| 2,836,041 A | 5/1958 | Petrie | |
| 2,864,244 A | 12/1958 | Prachar | |
| 2,902,303 A | 9/1959 | Davis | |
| 2,988,325 A | 6/1961 | Dawson | |
| 3,060,538 A | 10/1962 | Simi | |
| 3,260,293 A | 7/1966 | Gohs | |
| 3,397,726 A | 8/1968 | Gohs | |
| 3,402,750 A | 9/1968 | Readman et al. | |
| 3,449,926 A * | 6/1969 | Hawkins | 464/154 |
| 3,571,886 A * | 3/1971 | Corsmeier | 29/270 |
| 3,600,735 A * | 8/1971 | Jerabek | 15/49.1 |
| 3,602,535 A * | 8/1971 | Behning et al. | 403/118 |
| 3,964,530 A | 6/1976 | Nickles | |
| 3,997,962 A | 12/1976 | Kleitz et al. | |
| 4,004,860 A | 1/1977 | Gee | |
| 4,019,833 A | 4/1977 | Gale | |
| 4,072,385 A | 2/1978 | Wallner | |

(Continued)

FOREIGN PATENT DOCUMENTS

| | | |
|---|---|---|
| EP | 0463995 | 6/1991 |
| GB | 23991 | 0/1908 |

(Continued)

*Primary Examiner* — Daniel P. Stodola
*Assistant Examiner* — Daniel Wiley
(74) *Attorney, Agent, or Firm* — Carlson, Gaskey & Olds, P.C.

(57) ABSTRACT

An example coupling stack includes a first rotating member and a second rotating member. A plurality of aligned slots is defined in the first rotating member and the second rotating member. A tab lock is provided having an annular body with an axial front side, an axial back side, and a radial inner periphery. Tabs are formed on the axial back side and inserted into the plurality of aligned slots. The annular body of the tab lock also includes a plurality of openings extending into the radial inner periphery. A plurality of flanges is provided on the axial back side of the annular body adjacent to the plurality of openings.

15 Claims, 8 Drawing Sheets

(56) References Cited

U.S. PATENT DOCUMENTS

| | | | |
|---|---|---|---|
| 4,305,180 A | 12/1981 | Schwartz | |
| 4,472,163 A * | 9/1984 | Bottini | 474/160 |
| 4,480,958 A | 11/1984 | Schlechtweg | |
| 4,582,467 A | 4/1986 | Kisling | |
| 4,664,599 A | 5/1987 | Robbins et al. | |
| 4,669,959 A | 6/1987 | Kalogeros | |
| 4,820,116 A | 4/1989 | Hovan et al. | |
| 4,822,244 A | 4/1989 | Maier et al. | |
| 4,854,821 A | 8/1989 | Kernon et al. | |
| 4,880,354 A | 11/1989 | Teranishi et al. | |
| 4,882,902 A | 11/1989 | Reigel et al. | |
| 4,890,981 A | 1/1990 | Corsmeier et al. | |
| 5,039,139 A | 8/1991 | McElroy et al. | |
| 5,135,124 A | 8/1992 | Wobser | |
| 5,145,276 A * | 9/1992 | Demange | 403/349 |
| 5,173,024 A | 12/1992 | Mouchel et al. | |
| 5,236,302 A | 8/1993 | Weisgerber et al. | |
| 5,275,534 A | 1/1994 | Cameron et al. | |
| 5,472,313 A | 12/1995 | Quinones et al. | |
| 5,685,730 A | 11/1997 | Cameron et al. | |
| 6,226,068 B1 | 5/2001 | Arcykiewicz et al. | |
| 6,292,142 B1 * | 9/2001 | Pittman | 343/700 MS |
| 6,309,154 B1 | 10/2001 | Higgins | |
| 7,673,849 B2 | 3/2010 | Britton et al. | |
| 7,811,052 B2 * | 10/2010 | Guihard et al. | 415/122.1 |
| 2008/0063489 A1 | 3/2008 | Jimenez | |

FOREIGN PATENT DOCUMENTS

| | | |
|---|---|---|
| GB | 255572 | 7/1926 |
| GB | 444211 | 3/1936 |
| GB | 577508 | 5/1946 |
| GB | 913501 | 12/1962 |
| GB | 2042652 | 9/1980 |

* cited by examiner

TURBINE ENGINE COUPLING STACK

BACKGROUND OF THE INVENTION

This application relates generally to a gas turbine engine, and more specifically to a coupling system which prevents rotation between components of the gas turbine engine.

A gas turbine engine typically includes a compressor which compresses air and delivers the air into a combustion section. In the combustion section air is mixed with fuel and combusted. Products of this combustion pass downstream over a turbine section. In one type of gas turbine engine, there are both low pressure and high pressure compressors, and low pressure and high pressure turbines. A "coupling stack" may attach the low pressure turbine to the low pressure compressor, such that the low pressure turbine drives the low pressure compressor to rotate. A tie-bolt may connect the two, and extends along a center line axis of the gas turbine engine. The coupling stack may also include a spanner nut, and a tab lock to connect the components.

During assembly, the tie-bolt may be stretched by a tool to provide a high amount of preload pressure, or tension, to the tie-bolt. When the tool is released, the tension on the tie-bolt provides compression throughout the coupling stack. The preload pressure provides enough force throughout the coupling stack to control relative movement between the components of the coupling stack. However, during operation, vibrations may cause the components to become unspooled, or loosened, such that the components may rotate relative to each other. Unspooling between components can cause a loss of preload pressure within the coupling stack.

Furthermore, the work area within the gas turbine engine for many components is at a small diameter and a great distance from a mechanic, and in a somewhat covered location, resulting in blind assembly.

SUMMARY OF THE INVENTION

An example coupling stack includes coupling first rotating member and a second rotating member. A plurality of aligned slots is defined in the first rotating member and the second rotating member. A tab lock is provided having an annular body with an axial front side, an axial back side, and a radial inner periphery. Tabs are formed on the axial back side and inserted into the plurality of aligned slots. The annular body of the tab lock also includes a plurality of openings extending into the radial inner periphery. A plurality of flanges is provided on the axial back side of the annular body adjacent to the plurality of openings.

An exemplary method for preventing rotation in an engine coupling stack includes providing a tab lock with an annular body and a plurality of openings extending into a radial inner periphery of the annular body. A plurality of openings in an axial back side of the annular body of the tab lock is aligned with a plurality of lips on a tool. The tab lock rotates relative to the tool to a locked position such that the plurality of lips is locked against the axial back side of the annular body. The tab lock is then moved into the coupling stack and a plurality of tabs on the tab lock is aligned with a plurality of slots between a tie-boltand an input coupling. The plurality of tabs is then inserted into the plurality of slots. The tool is then rotated relative to the tab lock to an unlocked position such that the plurality of lips is aligned with the plurality of openings. The tool is then removed, leaving the tab lock in place.

These and other features of the present invention can be best understood from the following specification and drawings.

DETAILED DESCRIPTION

Figure 1:
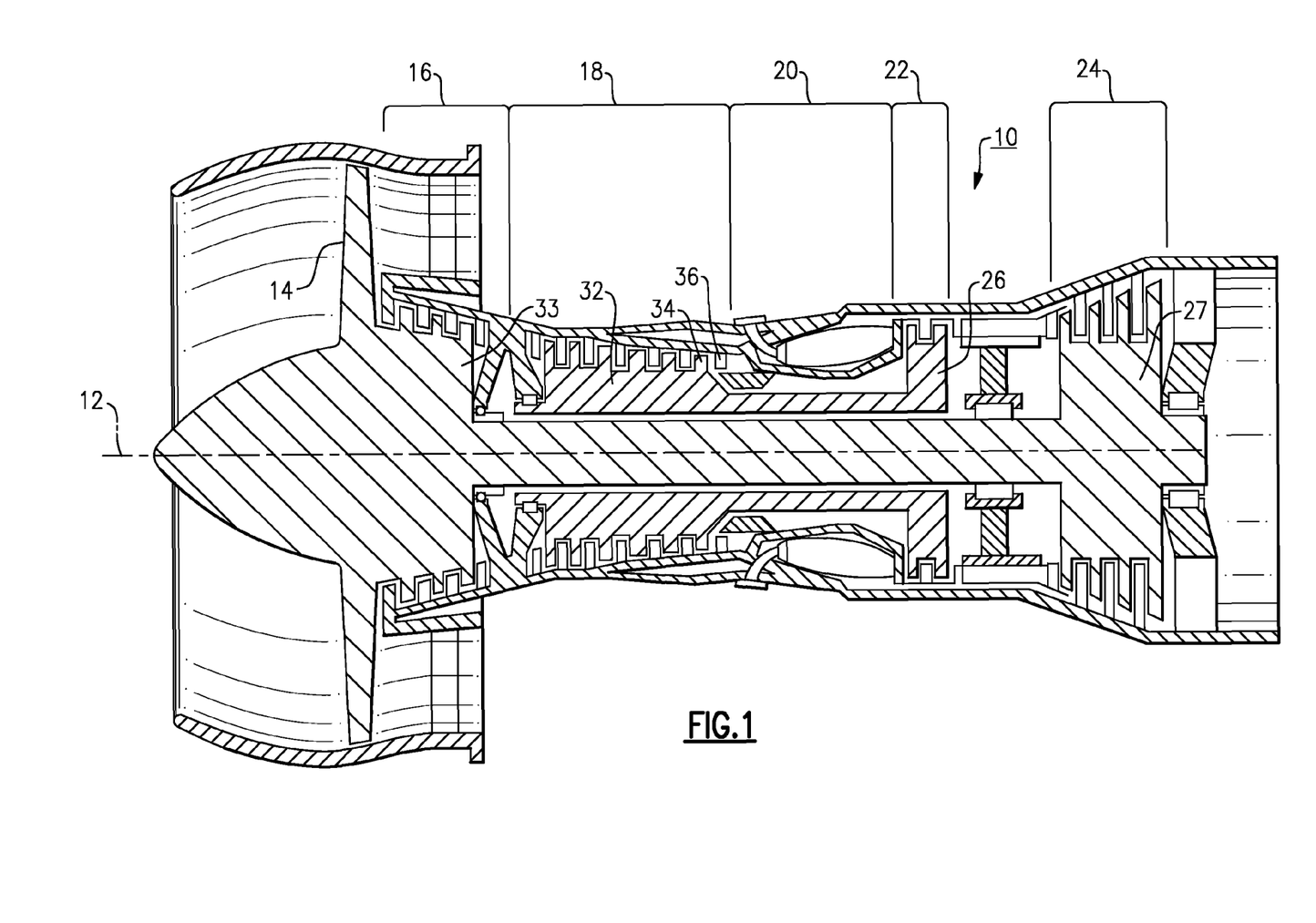
FIG. 1 shows a cross sectional view of an example gas turbine engine.

Referring to FIG. 1, a gas turbine engine 10, such as a turbofan gas turbine engine, is circumferentially disposed about an engine centerline, or centerline axis 12. The gas turbine engine 10 includes a fan 14, a low pressure compressor section 16, a high pressure compressor section 18, a combustion section 20, a high pressure turbine section 22, and a low pressure turbine section 24. It is within the contemplation of this disclosure to utilize a gas turbine engine 10 with more or fewer sections. Air is compressed in the low pressure compressor section 16 and the high pressure compressor section 18, mixed with fuel and burned in the combustion section 20, and expanded across the high pressure turbine section 22 and the low pressure turbine section 24.

The high pressure compressor section 18 and the low pressure compressor section 16 include rotors 32 and 33, respectively, about the centerline axis 12. The high pressure compressor section 18 and the low pressure compressor section 16 also include alternating rows of rotating airfoils or rotating compressor blades 34 and static airfoils or static vanes 36. The high pressure turbine section 22 and the low pressure turbine section 24 each include rotors 26 and 27, respectively, which rotate in response to expansion, driving the high pressure compressor section 18 and the low pressure compressor section 16.

Figure 2:
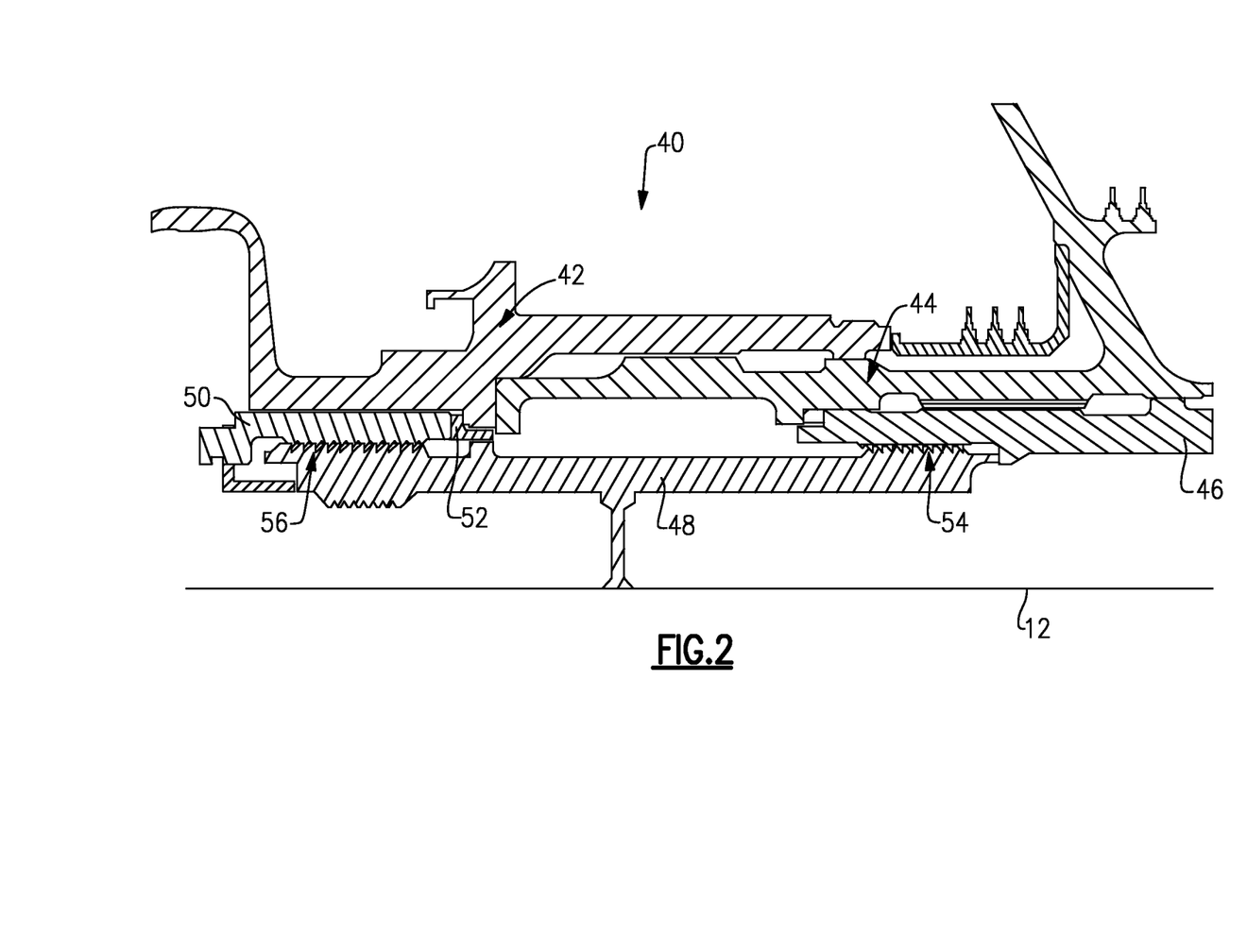
FIG. 2 shows a sectional view of the coupling stack within a gas turbine engine

Referring to FIG. 2, with continued reference to FIG. 1, a coupling stack 40 attaches different components within the gas turbine engine 10. The coupling stack 40 includes an input coupling 42, a low pressure compressor hub 44, a low pressure turbine shaft 46, a tie-bolt 48, a spanner nut 50, and a tab lock 52. The low pressure turbine shaft 46 is attached to the low pressure compressor hub 44. The low pressure turbine shaft 46 is also attached to the tie-bolt 48 by threading at a first position 54. The tie-bolt 48 is also attached to a spanner nut 50 by threading at a second position 56. In one example, the threading is accomplished using buttress threading, which is able to handle high axial loads within the system while having a higher allowable stress and strength load. Furthermore, the buttress threading allows higher axial loads with small amounts of radial movement.

Prior to attaching the tie-bolt 48 and spanner nut 50 by threading, the tie-bolt 48 is stretched at the second position 56 to create a preload pressure using a stretching tool 100 (described below). When the spanner nut 50 is inserted into the system and attached to the tie-bolt 48 by threading, the tool 100 stretching the tie-bolt 48 is released creating pressure on the spanner nut 50 from the tie-bolt 48. Once the tool 100 is released, the coupling stack 40 is preloaded. During operation, coupling stack 40 preload is maintained at a minimum pressure load requirement.

The spanner nut 50 is in contact with the tab lock 52. The spanner nut 50 provides pressure to the tab lock 52 to keep the tab lock 52 locked in place. The tab lock 52 is in contact with the tie-bolt 48 and the input coupling 42 to prevent unspooling, or rotation, between the tie-bolt 48 and input coupling 42.

The coupling stack 40 rotates around a centerline axis 12 within the gas turbine engine 10. The low pressure compressor hub 44 is connected to the low pressure compressor rotors 33 (See FIG. 1). Furthermore, the input coupling 42 is connected with the fan 14 (See FIG. 1).

Figure 3A:
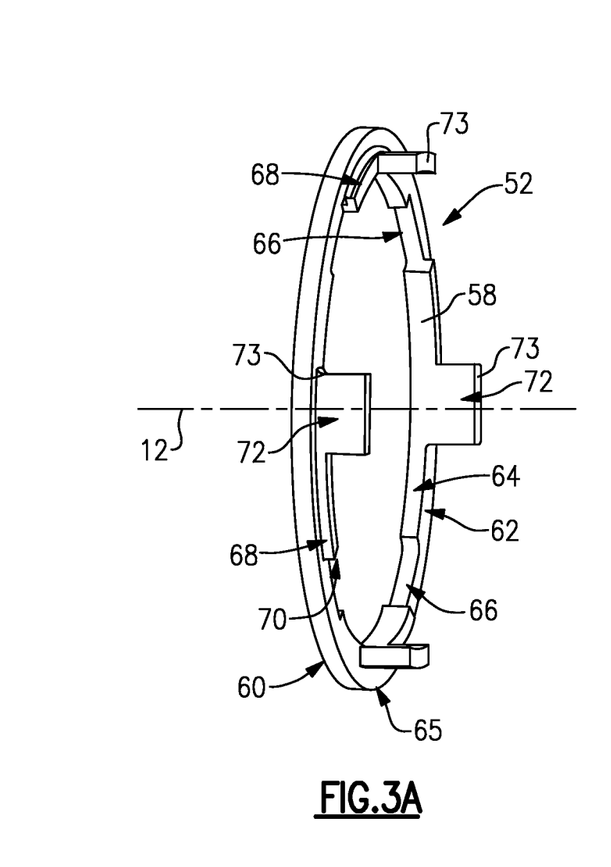
FIG. 3A shows a perspective side view of an example tab lock.
Figure 3B:
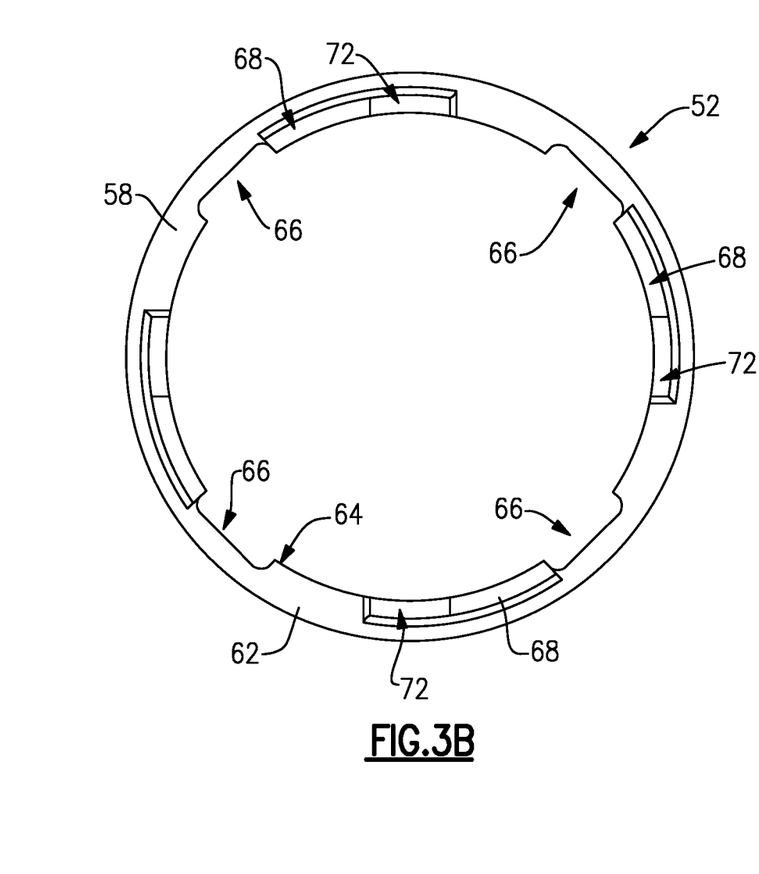
FIG. 3B shows a perspective view of an example tab lock from the axial rear direction.

Referring to FIGS. 3A and 3B, the tab lock 52 includes an annular body 58 with an axial front side 60 and an axial back side 62. The annular body 58 also includes a radial inner periphery 64 and a radial outer periphery 65. A plurality of openings 66 are provided extending into the radial inner periphery 64 of the tab lock 52. The plurality of openings 66 is used in conjunction with an insertion tool 90 (described below) to create a bayonet lock, allowing for insertion of the tab lock 52 into the coupling stack 40.

A plurality of flanges 68 located on the axial back side 62 extends from the axial back side 62 in an axial direction opposite the axial front side 60. In one example, a first side 70 of each of the plurality of flanges 68 is adjacent to one of the plurality of openings 66. The first side 70 provides a stop, preventing rotation in one direction when used in conjunction with the insertion tool 90. The size of the plurality of openings 66 is determined by the stress capability of the tab lock 52, which depends upon an axial width as well as a radial diameter of the tab lock 52.

The plurality of flanges 68 each includes a tab 72. Each tab 72 has an axial length extending from the axial back side 62 of the tab lock 52 to an end 73. The axial length of the tab 72 along the centerline axis 12 is greater than the axial length of the flange 68 from the axial back side 62 of the tab lock 52. As shown, the plurality of flanges 68 are equally sized and equally spaced in a radial direction around the annular body 58. However, it is within the contemplation of this disclosure to employ different sized flanges 68 and different spacing between the flanges 68.

The tab lock 52 includes four sets of flanges 68 and tabs 72. However, it is within the contemplation of this disclosure to use any number of tabs 72 and flanges 68. In one example, the tab lock 52 is made of an iron-based alloy treated to prevent corrosion. However, it is within the contemplation of this disclosure to use other alloys or materials as engine requirements dictate. Further, the tabs 72 may be formed separate of the flanges 68.

Figure 4:
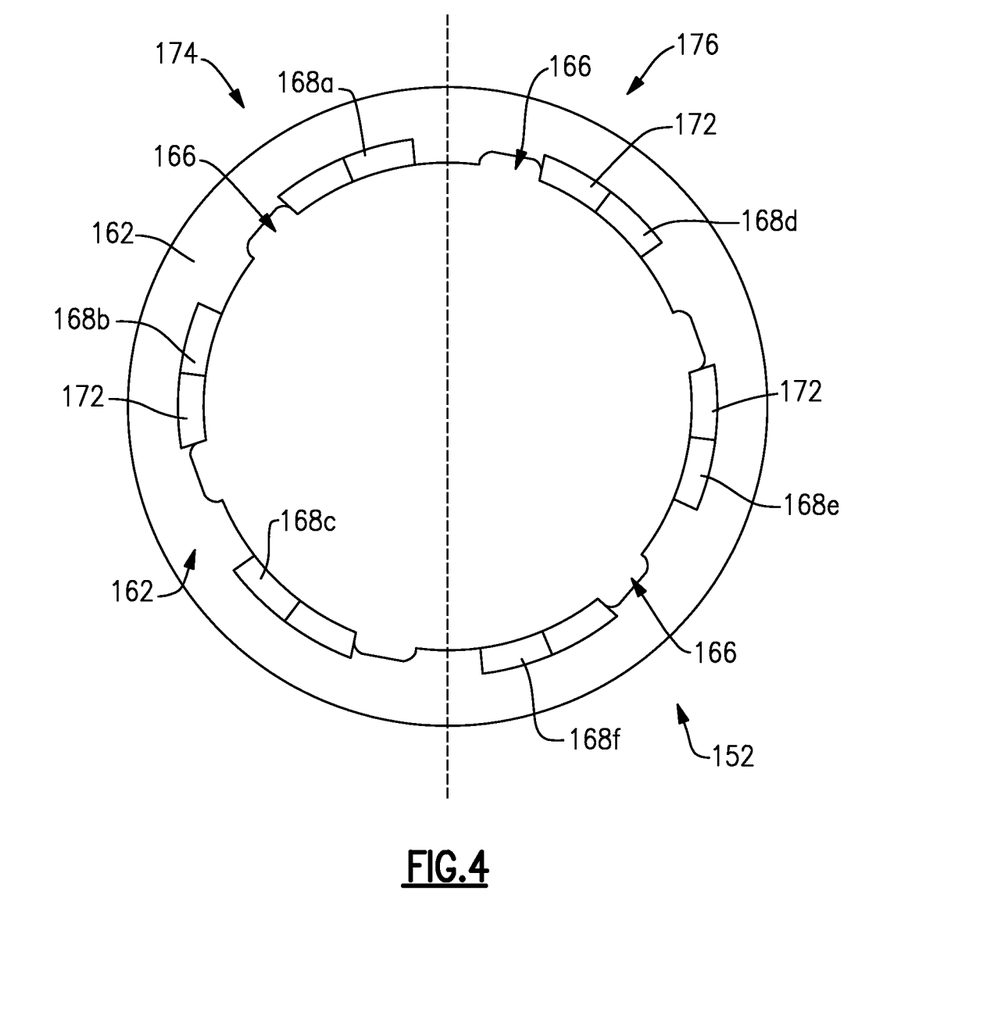
FIG. 4 shows another perspective view of a second embodiment of a tab lock from the axial rear direction.

Referring to FIG. 4, a second embodiment tab lock 152 includes six flanges 168a-f, six tabs 172, and six openings 166.

Figure 5:
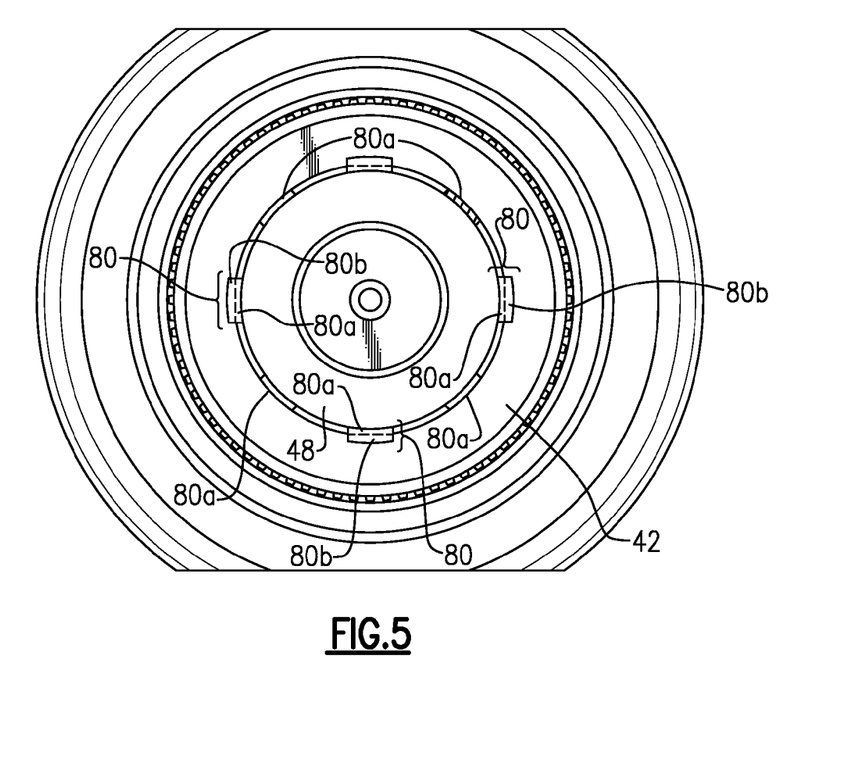
FIG. 5 shows an axial cross sectional view of an example tie-bolt and input coupling within a gas turbine engine.

Referring to FIG. 5, the tie-bolt 48 is radially inward of the input coupling 42. A plurality of slots 80 are formed radially between the tie-bolt 48 and the input coupling 42. The tie-bolt 48 and input coupling 42 each include a number of partial slots, 80a and 80b respectively, which are aligned to form the slots 80. The tie-bolt 48 may also include more partial slots 80a than partial slots 80b of the input coupling 42 to allow for easier alignment of the tie-bolt 48 and input coupling 42. The slots 80 are circumferentially spaced equally apart, however it is within the contemplation of this disclosure to use other configurations of slots 80. Although, four slots 80 are shown, it is within the contemplation of this disclosure to use any number of slots 80 to provide for easier insertion of the tabs 72 of the tab lock 52.

Figure 6:
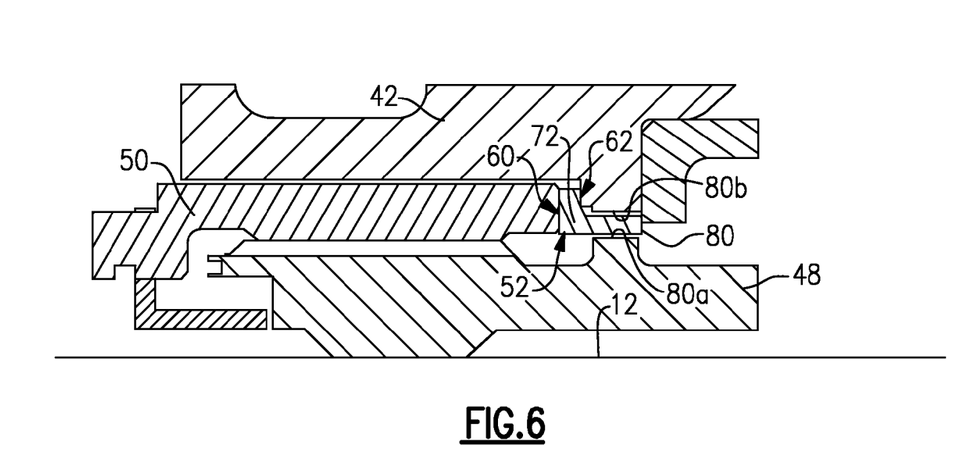
FIG. 6 shows a cross sectional view of a portion of the coupling stack within a gas turbine engine.

Referring to FIG. 6, with continued reference to FIGS. 2, 3A, and 3B, the axial front side 60 of the tab lock 52 is in contact with the spanner nut 50 to provide pressure from the spanner nut 50 to the tab lock 52 in an axial outward direction along the centerline axis 12. Each of the tabs 72 extend in an axial direction from the axial back side 62 of the tab lock 52 into the slots 80 defined between the input coupling 42 and tie-bolt 48 and prevent unspooling between the input coupling 42 and the tie-bolt 48. A bias force from the spanner nut 50 keeps the tab lock 52 in place.

Figure 7A:
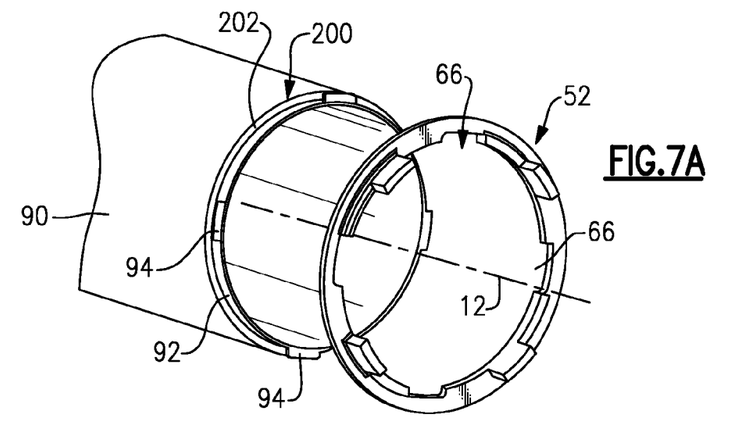
FIG. 7A shows a perspective view of an example tab lock and an example insertion tool being aligned.

Referring to FIG. 7A, an insertion tool 90 is provided. The insertion tool 90 includes an outer face 200 and a ring 92. The ring 92 includes a plurality of lips 94 extending in a radial direction. The ring 92 is located radially inward of the outer face 200. The lips 94 are sized to pass through the plurality of openings 66 of the tab lock 52. A surface 202 is defined between the ring 92 and the outer face 200.

Figure 7B:
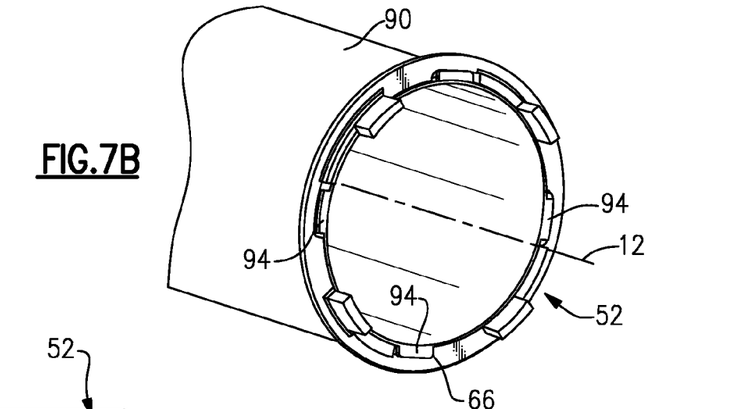
FIG. 7B shows a perspective view of an example tab lock and an example insertion tool in an unlocked position.

Referring to FIG. 7B, the lips 94 of the insertion tool 90 are aligned with the openings 66 of the tab lock 52 such that the lips 94 can pass through the openings 66.

Figure 7C:
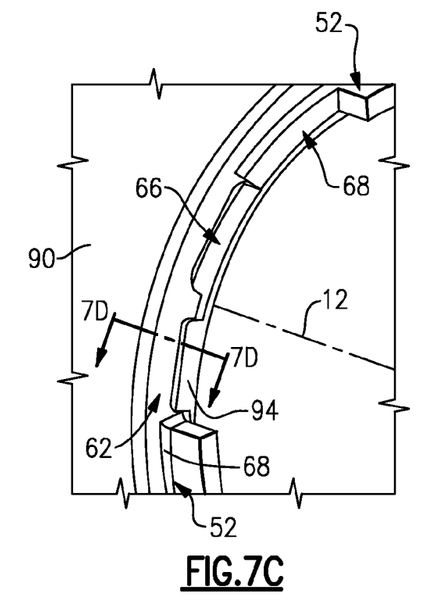
FIG. 7C shows a perspective view of an example tab lock and an example insertion tool in a locked position.

Referring to FIG. 7C, the tab lock 52 is then rotated relative to the insertion tool 90 such that the plurality of lips 94 is rotated to a locked position. The plurality of lips 94 may only move in one circumferential direction due to the flanges 68 of the tab lock 52 preventing rotation in the opposite radial direction. The lips 94 are rotated until stopped, after coming into contact with another flange 68.

Figure 7D:
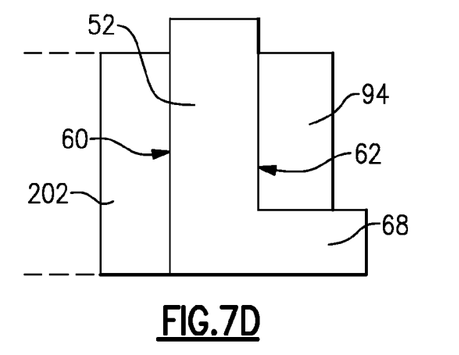
FIG. 7D shows a side view of an example tab lock and an example insertion tool in a locked position.

Referring to FIG. 7D, the plurality of lips 94 are in contact with both the axial back side 62 of the tab lock 52 and the flange 68, preventing further rotation of the insertion tool 90 and creating a bayonet lock. The axial front side 60 of the tab lock 52 is in contact with the surface 202 of the insertion tool 90. The tab lock 52 is attached to the insertion tool 90 by being held in place between the lip 94 and the surface 202.

Referring to FIGS. 2, 5, and 7A-7D, the use of the insertion tool 90 allows the insertion of the tab lock 52 into the slots 80 between the input coupling 42 and the tie-bolt 48. The insertion of the tab lock 52 often results in blind assembly. That is, the mechanic is unable to see the components as they are being inserted. The use of a bayonet lock to attach the tab lock 52 to the insertion tool 90 allows the mechanic to rotate the tab lock 52 until it is aligned with the slots 80 defined between the tie-bolt 48 and the input coupling 42.

Figure 8A:
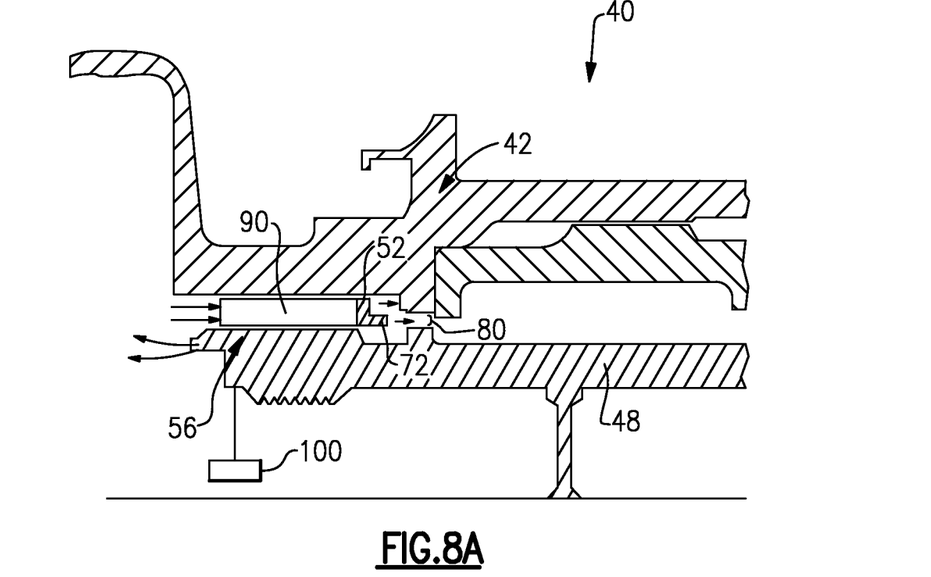
FIG. 8A shows a sectional view of a portion of the coupling stack with an insertion tool and tab lock being inserted.

Referring to FIG. 8A, during installation a tool 100 stretches the tie-bolt 48. The tie-bolt 48, the connected tab lock 52 and insertion tool 90 are moved into the coupling stack 40. The insertion tool 90 with attached tab lock 52 is adjusted until the plurality of tabs 72 are aligned with a plurality of slots 80 defined between the tie-bolt 48 and the input coupling 42 such that the plurality of tabs 72 can axially slide into the plurality of slots 80.

Figure 8B:
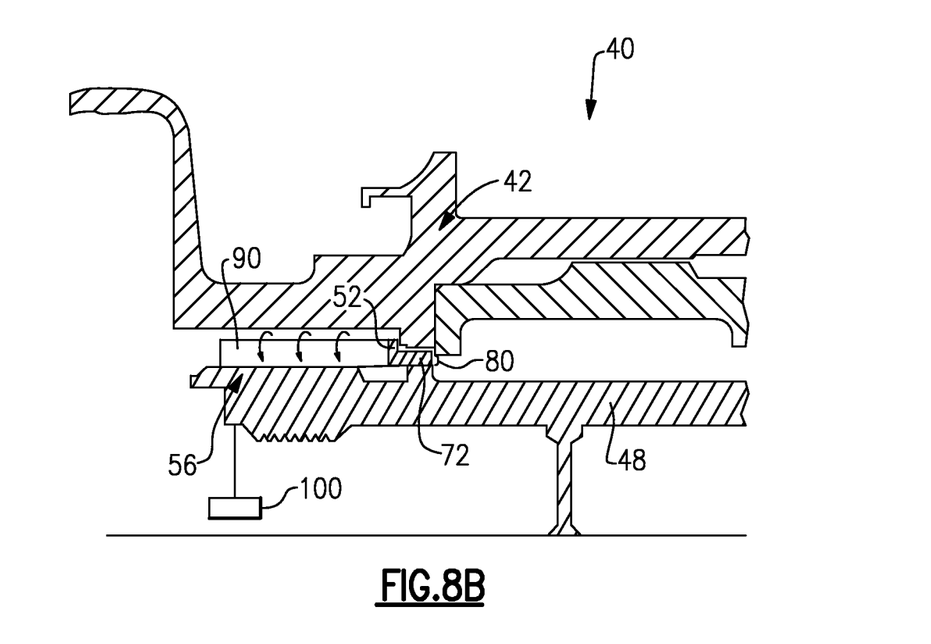
FIG. 8B shows a sectional view of a portion of the coupling stack with the tab lock inserted and the insertion tool being rotated.

Referring to FIG. 8B, the insertion tool 90 is then rotated in an opposite direction from initial rotation to disengage the insertion tool 90 from the tab lock 52.

Figure 8C:
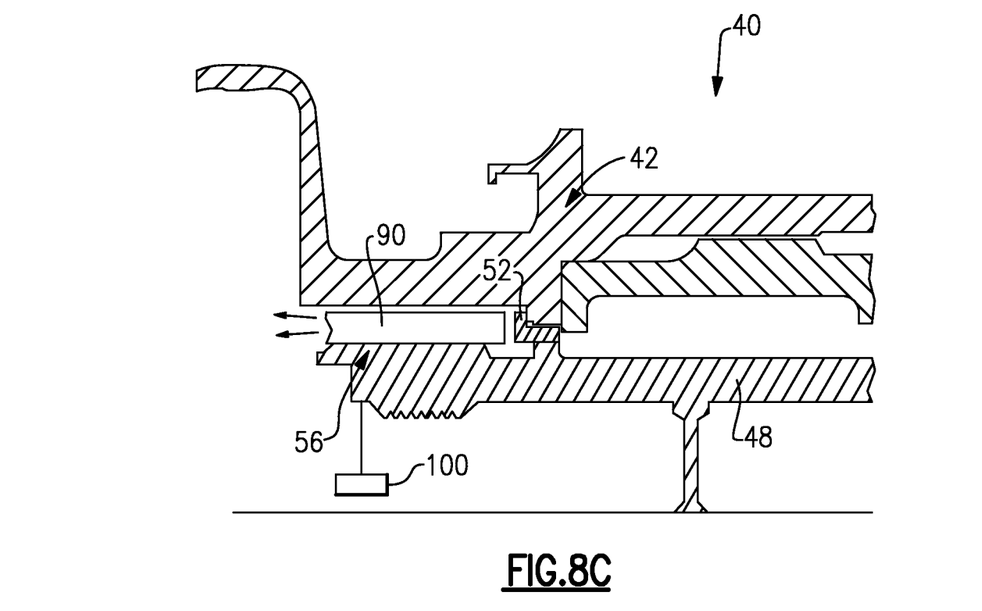
FIG. 8C shows a sectional view of a portion of the coupling stack with the insertion tool being removed.

Referring to FIG. 8C, with the plurality of tabs 72 inserted into the plurality of slots 80, the insertion tool 90 is removed from the coupling stack 40.

Figure 8D:
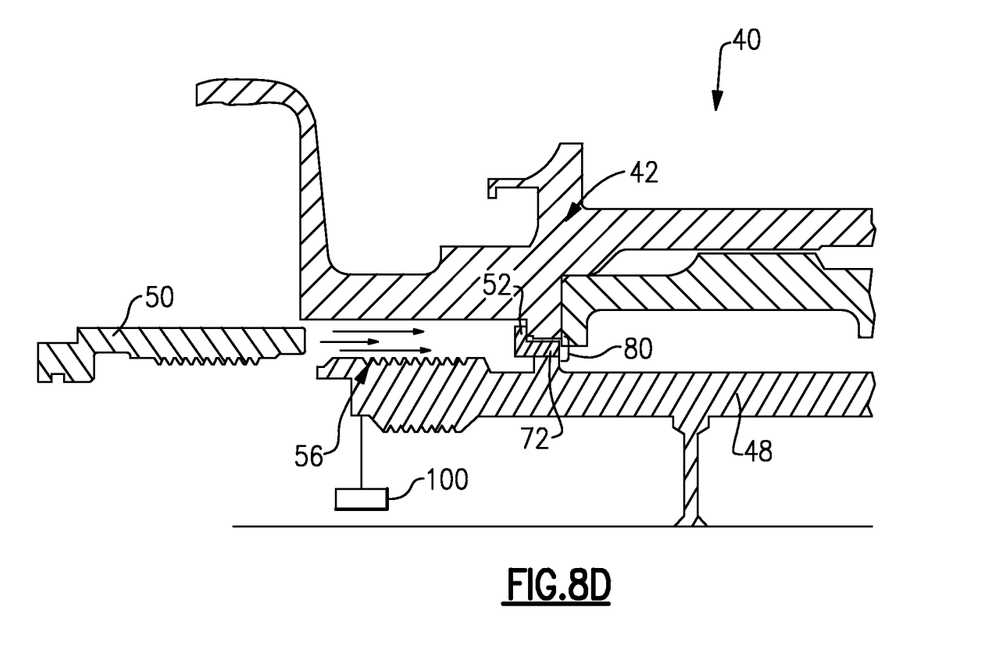
FIG. 8D shows a sectional view of a portion of the coupling stack with the nut being inserted.

Referring to FIG. 8D, the spanner nut 50 is then inserted. The spanner nut 50 is attached to the tie-bolt 48 by threading at the second position 56, and is in contact with the tab lock 52. Once the spanner nut 50 is attached, a tool 100 used to stretch the tie-bolt 48 is released, creating a preload pressure on the spanner nut 50 which then in turn applies a bias force to the tab lock 52 holding the tab lock 52 in place. The tab lock 52 is then able to prevent unspooling between the tie-bolt 48 and input coupling 42.

Although a coupling stack 40 including an input coupling 42 and tie-bolt 48 is disclosed, it is within the contemplation of this disclosure to encompass use of the tab lock 52 with other components of a coupling stack 40 such that a first rotating member and a second rotating member define a plurality of slots 80.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan disposed about an axis;
   a compressor section axially aft of the fan and arranged to receive air flow from the fan;
   a combustion section axially aft of the compressor section and fluidly connected to the compressor section;
   a turbine section connected to the compressor section and arranged to drive the compressor section; and
   a coupling stack through which the turbine section drives the compressor section, the coupling stack comprising:
   an input coupling connected to the fan;
   a tie-bolt;
   a plurality of aligned slots defined in the input coupling and the tie-bolt; and
   a tab lock having an annular body with an axial front side and an axial back side, the annular body including a plurality of openings extending into a radial inner periphery of the annular body, a plurality of flanges on the axial back side of the annular body adjacent to the plurality of openings, and a plurality of tabs, at least a portion of each tab inserted into one of the plurality of aligned slots.

2. The gas turbine engine of claim 1, wherein the plurality of tabs each extend from one of the plurality of flanges.

3. The gas turbine engine of claim 1, wherein a nut provides pressure on the tab lock such that the tabs are biased into the slots.

4. The gas turbine engine of claim 3, wherein the nut is threaded to the tie-bolt.

5. The gas turbine engine of claim 1, wherein a turbine shaft is attached to the tie-bolt at a first position.

6. The gas turbine engine of claim 5, wherein the input coupling further includes a compressor hub attached to the turbine shaft.

7. The gas turbine engine of claim 1, wherein a number of the plurality of slots is greater than a number of the plurality of tabs.

8. The gas turbine engine of claim 1, wherein the plurality of slots are equally circumferentially spaced apart.

9. The gas turbine engine of claim 1, wherein the plurality of openings are equally circumferentially spaced apart around the annular body.

10. The gas turbine engine of claim 9, wherein the plurality of flanges are equally circumferentially spaced apart around the annular body.

11. The gas turbine engine of claim 1, wherein the tab lock includes at least four tabs.

12. The gas turbine engine of claim 1, wherein the plurality of flanges are adjacent the radial inner periphery of the annular body.

13. The gas turbine engine of claim 1, wherein the tab lock is made of an iron-based alloy.

14. The gas turbine engine of claim 1, wherein a tool stretches the tie-bolt to create a preload pressure.

15. The gas turbine engine of claim 1, wherein the coupling stack includes a compressor hub attached to a turbine shaft, wherein the turbine shaft is attached to the tie-bolt.

* * * * *